US006596124B2

(12) United States Patent
Hookham et al.

(10) Patent No.: US 6,596,124 B2
(45) **Date of Patent: *Jul. 22, 2003**

(54) FORMING PROCESS FOR CELLULOSE PAPER BASED HONEYCOMB STRUCTURES

(75) Inventors: Nigel Hookham, Fenstanton; Andrew Lee, Walden, both of (GB)

(73) Assignee: Hexcel Corporation, Dublin, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/970,740

(22) Filed: Oct. 3, 2001

(65) Prior Publication Data

US 2002/0086912 A1 Jul. 4, 2002

(30) Foreign Application Priority Data

Oct. 4, 2000 (GB) ............................................ 0024247

(51) Int. Cl.[7] ............................ C08J 9/00; B21D 35/00

(52) U.S. Cl. ....................... 162/101; 101/109; 101/115; 101/218; 521/76; 521/82; 521/84.1

(58) Field of Search ......................... 521/84.1; 162/101, 162/109, 115, 218

(56) References Cited

U.S. PATENT DOCUMENTS

| | | | |
|---|---|---|---|
| 3,724,825 A | 4/1973 | Streck | 261/95 |
| 5,119,535 A | 6/1992 | Gnagy et al. | 29/469.5 |
| 6,194,477 B1 | 2/2001 | Cawse et al. | 521/76 |

FOREIGN PATENT DOCUMENTS

| | | |
|---|---|---|
| DE | 195006694 A1 | 9/2001 |
| JP | 02047396 | 2/1990 |
| SE | 476424 | 12/1937 |

*Primary Examiner*—Morton Foelak
(74) *Attorney, Agent, or Firm*—Shapiro & Dupont LLP

(57) ABSTRACT

A method of forming a cellular material or “core” by immersing the core in water until it is sufficiently flexible to be molded around a tool into the required shape and then drying the formed core such that the core then retains that shape.

24 Claims, 3 Drawing Sheets

FORMING PROCESS FOR CELLULOSE PAPER BASED HONEYCOMB STRUCTURES

BACKGROUND OF THE INVENTION

1. Field of the Invention

This invention relates to a method of forming cellulose paper based honeycomb structures.

2. Description of Related Art

Honeycomb structures, i.e. structures with regularly shaped (usually hexagonal) cells, may be manufactured, usually in the form of panels, from a variety of materials such as metal, aramid or cellulose paper. U.S. Pat. No. 6,194,477 B1 (European Patent Application 0967070A) describes a method of making a cellular material in which an expanded cellular (honeycomb) structure is made from a dense, non-porous cellulose paper, which paper has an air permeance of less than 30 ml/min. An aqueous composition is applied to the cellular structure which is then heated sufficiently to stabilize the structure for commercial stability. The resulting cellular structure is coated with a thermosetting resin and the resin is then cured.

Aramid based honeycombs tend to comprise NOMEX®, that is poly(m-phenylene isophthalamide), which is made by DuPont (Wilmington, Del.).

It is commonplace to undercure the resin coating of such honeycombs in order to achieve improved formability of the products. This gives rise to a higher moisture content than is desirable thus compromising the structural integrity of the product.

In order to form the NOMEX® based panels into a desired shape it is first necessary to heat the panels in excess of 200° C. before forming the panels into shape on cooling. Because of the cellular configuration of the core, the nature of the material from which it is made and the inefficiency of convection heating, the NOMEX® core heats up relatively slowly and unevenly in the convection oven. The difficulty in evenly heating the NOMEX® core also places significant constraints on the uses of the formed core. Even when the formed NOMEX® core is of acceptable quality it cannot generally be used in load-bearing applications because its strength is reduced by charring and other degrading effects of convection heating. Moreover, the final configurations which may be obtained are limited. For example, curved configurations are limited to relatively low degrees of curvature. U.S. Pat. No. 5,119,535 describes the use of a fluidized bed to provide relatively even heating of NOMEX® core. The fluidized bed is heated to a temperature sufficiently high to soften the NOMEX® core and sufficiently low to avoid damaging the core. The core is immersed in the fluid and pressure is then applied to form the core against a mold. This is preferably done after the core and mold have been removed from the fluid. The core is then allowed to cool and harden. This method allows the core to be formed into more complex configurations than was previously thought possible. For example, an eight-pound core (123 $Kg/m^3$) with a thickness of up to four inches was allegedly successfully formed into a 90° configuration at 400° to 600° F. However, it is noted that this forming method is expensive to carry out in that it involves heating to high temperatures. It is difficult to assess the required duration of the heating step and as excess heating leads to core degradation the process could lead to significant failure unless carried out by an experienced operator. NOMEX® core is an expensive material and consequently such waste is unacceptable in commercial applications.

The cellulose based structures made in accordance with the specification of U.S. Pat. No. 6,194,477 B1 (European Patent Application 0967070A) are sold as flat (i.e., planar) sheets only. It has been found by the applicants of the present application that such panels may be formed if heated to a temperature above 200° C. However, this heating degrades the cellulose paper and consequently the mechanical performance of the formed honeycomb is dramatically adversely affected by the heating process.

SUMMARY OF THE INVENTION

The present invention seeks to provide a method of successfully forming products having cellulose-based substrates, such as those made in accordance with the method disclosed in U.S. Pat. No. 6,194,477 B1 (European Patent Application 0967070A), without significantly adversely affecting the mechanical properties of the honeycomb. For the avoidance of doubt by "forming the material" we mean altering the shape of the material.

According to the present invention there is provided a method of forming a cellular material by facilitating sufficient moisture pick up by the cellular material to enable forming of the cellular material into a final desired shape and subsequently removing sufficient water from the cellular material such that the cellular material then retains the said shape, the walls of the cells of said cellular material comprising a dense, non-porous cellulose based paper.

The aforesaid cellulose based paper preferably has an air permeance (before being formed into cells) of less than 30 ml/min.

The above discussed and many other features and attendant advantages of the present invention will become better understood by reference to the detailed description when taken in conjunction with the accompanying drawings.

DETAILED DESCRIPTION OF THE INVENTION

Figure 1:
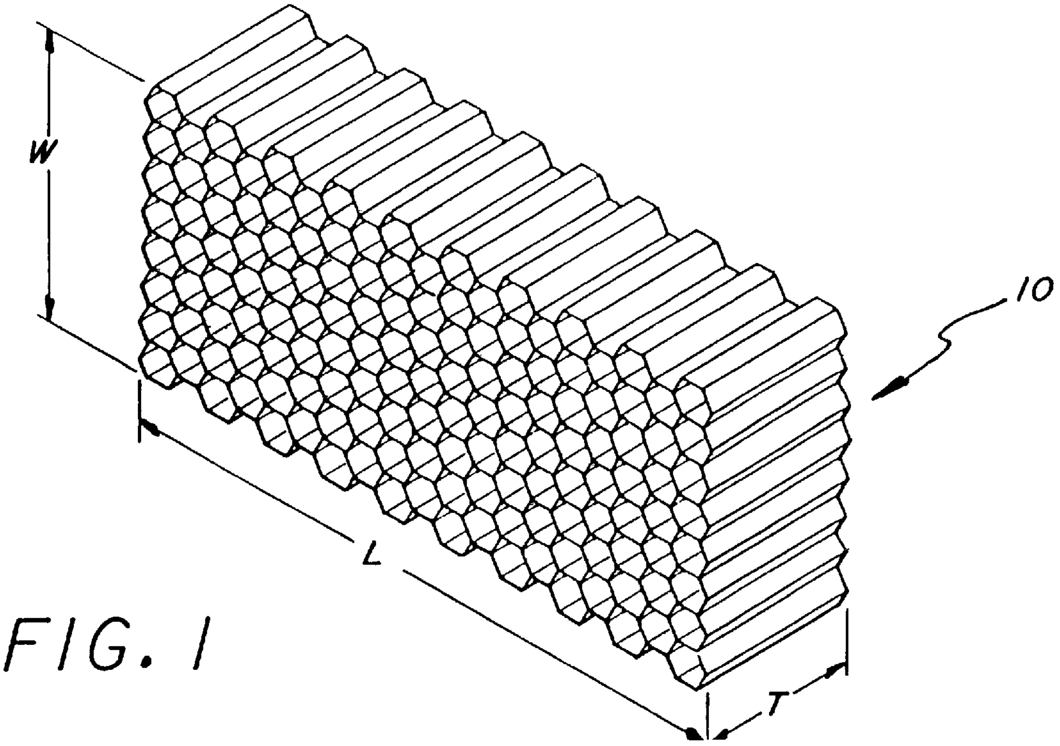
FIG. 1 depicts a preferred exemplary cellular material prior to forming into a non-planar shape in accordance with the present invention

The typical inherent water content of a cellulose honeycomb material made in accordance with the specification of U.S. Pat. No. 6,194,477 (European Patent Application 0967070) is in the range from 4% to 6% by weight depending on the density of the product. For example a typical 48 $kg/m^3$ density product has a water content of about 6% by weight and for a 144 $kg/m^3$ density product the moisture content is about 4% by weight. An exemplary cellulose based honeycomb prior to forming is shown at 10 in FIG. 1. "W" represents the width of the honeycomb 10, "L" represents the length and "T" represents the thickness.

Generally at least 7% by weight moisture content, based on the dry weight of the cellular material, is required to form shapes using lower density honeycombs although more may be required to form shapes using higher density honeycombs. The degree of formability is essentially determined by the amount of water uptake attainable.

The applicants have found that the method of the invention only works effectively on lower density products. Complex curved parts may be formed with panels having a density of 80 $kg/m^3$ or less and less complex forming may be achieved with panels having a density up to 122 $kg/m^3$.

The applicants have also found that the method of the invention is most effective when thinner cellular material is used. Complex curved parts may be formed with panels up to 25 mm thick (T=25 mm) by varying the parameters of the method as described herein.

It is noted that the method of the present invention facilitates forming to a much greater extent than has been found possible with prior art NOMEX® products.

Furthermore, the method of the present invention is suitable for the forming of materials in which the resin coating has been completely cured prior to forming, thereby, resulting in a desirable moisture content. It is noted that the type of resin coating has not been found to drastically affect the water uptake rate and saturation value for the cellular material, although water uptake is highest when the paper to resin ratio is high.

The forming method may be carried out at any temperature that would not adversely affect the material properties of the cellular structure, i.e. would degrade the structure. Preferably the operating temperature for the forming method is less than 180° C. and ideally is in the range from 20° C. to 80° C. Typically, the forming process takes place at room temperature and at atmospheric pressure. Consequently the process of the invention does not only provide a method of achieving forming of the products described in U.S. Pat. No. 6,194,477 B1 (EP 0967070A) without adversely affecting their material properties, but it is also simple, inexpensive and may be operated free from environmentally unfriendly solvents.

The applicants have found that the temperature of the water in which the honeycomb 10 is immersed affects the degree and rapidity of water uptake. For example, when a typical 48 $kg/m^3$ density cellular material is immersed in water at 16° C., after 10 minutes its water content is approximately 17.5% compared to 21% when the same density cellular material is immersed in water at 54° C. Following an immersion time of 20 minutes (approximate saturation point) the water content of the cellular material immersed in water at 16° C. is approximately 25.5% compared with 30.5% when the same density material is immersed in water at 54° C. Thus, the temperature of the water in which the cellular material to be formed by the method of the present invention is immersed is preferably in the range from 10 to 55° C. This is because the use of hot water facilitates both faster and greater water pick up by the cellular material.

The applicants have also found that the majority of water uptake occurs within the first 10 minutes of immersion. After this 10-minute period the rate of water uptake decreases as the cellular material or "core" becomes saturated. This trend is true for all cores tested to date. Total saturation is generally reached after 2 to 3 hours. Although there is no restriction upon the immersion time of the cellular material since no adverse effects have been found if the cellular material is immersed in excess of 5 hours, it is preferable that the immersion time is less than 40 minutes, more preferably less than 20 minutes and ideally no less than 10 minutes It has also been found that the thickness (T) of the cellular material does not affect the total water pick-up, but it can affect the rate of water pick up.

The products formed by the forming method of the present application have applications in existing markets in which NOMEX® honeycombs are used such as in the aerospace market, for example in interior lining panels, fairings and flaps as well as in other applications in view of the low cost of the product and forming method used, such as in the rail, marine and automotive sectors.

In a preferred embodiment of the present invention the cellular material (core 10) is immersed in warm water (54° C.) for 10 minutes in order to facilitate moisture pick up. However, no adverse effects have been found if the core 10 is left for a longer immersion period. It has also been found that the soaking process causes no degradation in mechanical properties of the honeycomb, which is not believed to be the case with NOMEX®.

Figure 2:
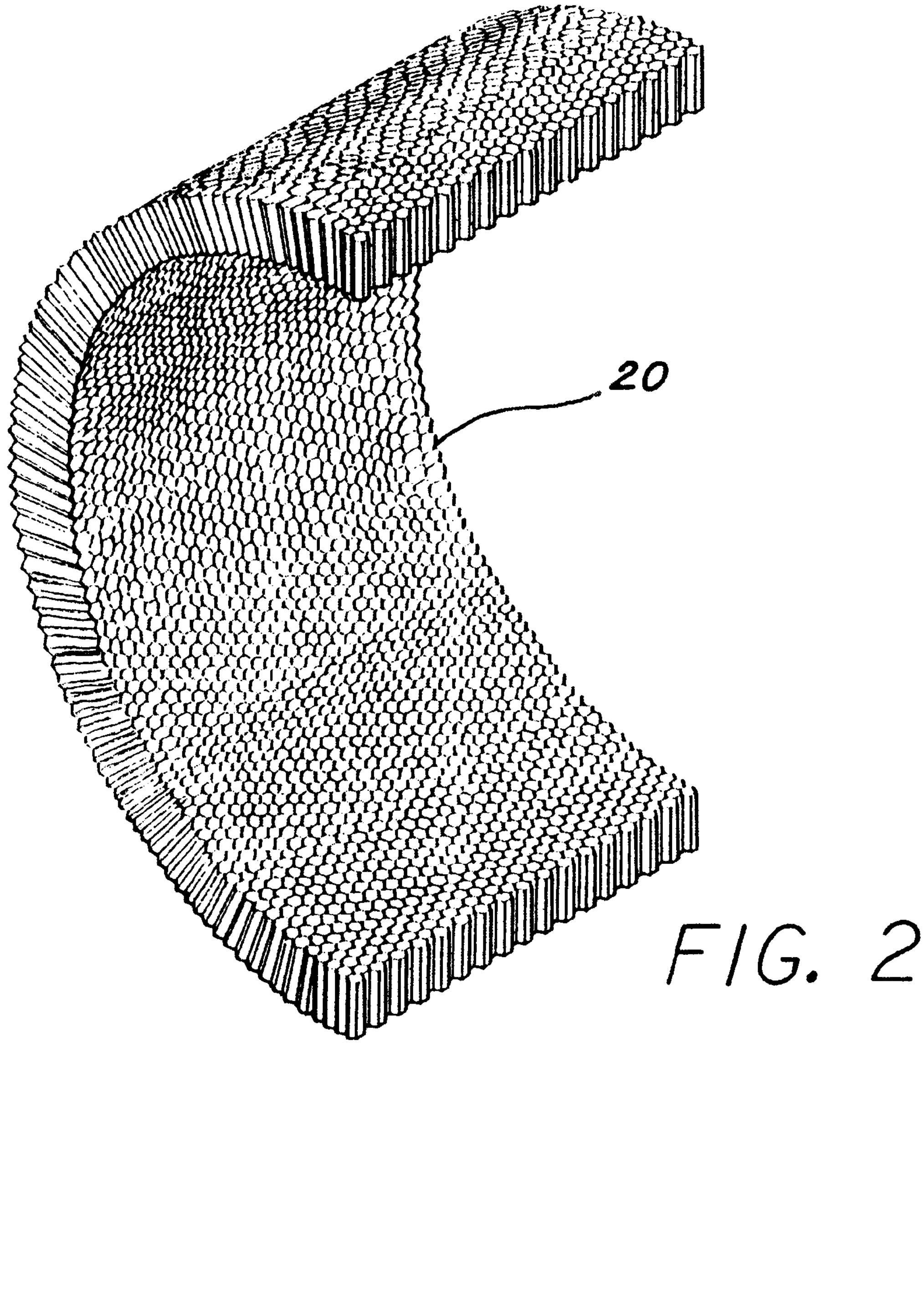
FIG. 2 depicts a preferred exemplary cellular material after it has been formed into a non-planar structure in accordance with the present invention.

When sufficient moisture pick up has occurred the cellular material 10 is placed over a tool and formed into the required shape by applying pressure. For complex shapes this may be achieved by containing the cellular material in a vacuum. This is typically carried out in a bag placed around the tool which is then evacuated so as to form a vacuum envelope. However, simple shapes may be formed by holding the cellular material against the tool by using removable fixings such as pressure sensitive adhesive tape. The core 10 is shown in FIG. 2 at 20 after having been formed in accordance with the present invention. The non-planar core shape shown in FIG. 2 is exemplary only with it being understood that more or less complex shapes are possible.

The forming method described herein is suitable for the formation of complex shapes incorporating curvatures up to at least 45° C.

The moist formed cellular material may be allowed to dry at room temperature. This typically takes about one hour, but may take longer for complex shapes. However, at increased temperatures drying time is reduced. For example at 60° C. drying time is typically about 15 minutes. The drying temperature is preferably in the range from 20° C. to 80° C., and more preferably from 40° C. to 80° C.

The applicants have found that the first 10 minutes in the drying process are crucial for water removal since the majority of the moisture is removed within this period. The rate of drying is not affected by the type of resin coating of the cellular material.

The rate of drying is influenced by the thickness of the core. For example, after 5 minutes at 80° C. the moisture content of material having thicknesses 6.86 mm and 12.7 mm was found to drop from 27% to 5% and after 10 minutes the moisture levels had further diminished to 2.5%. However, a 25 mm thick core, when subjected to the same procedure, was found to have a moisture content of 5% after 10 minutes with a further 5 to 10 minutes of drying being required to achieve a water content of 2.5% at which point the honeycomb felt both dry and set. Preferably, the drying time is at least 10 minutes at 80° C. and no longer than 20 minutes at 80° C. It is noted that the rate of moisture pick up, the rate of drying and the degree of forming is influenced by the thickness of the core.

Figure 3:
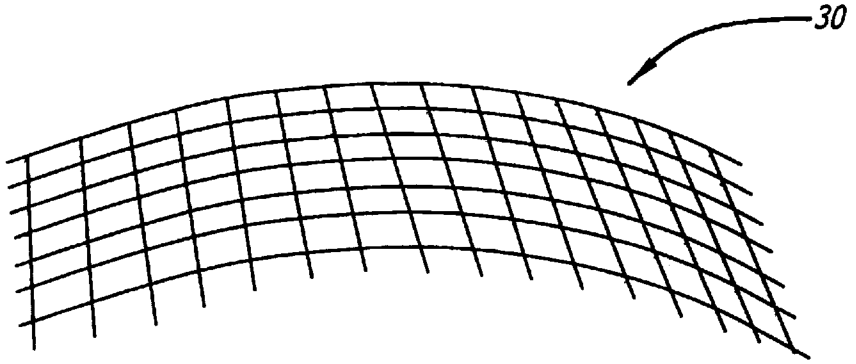
FIG. 3 is an exemplary wire mold for forming a shaped honeycomb having a radius of curvature of about 1000 mm.
Figure 4:
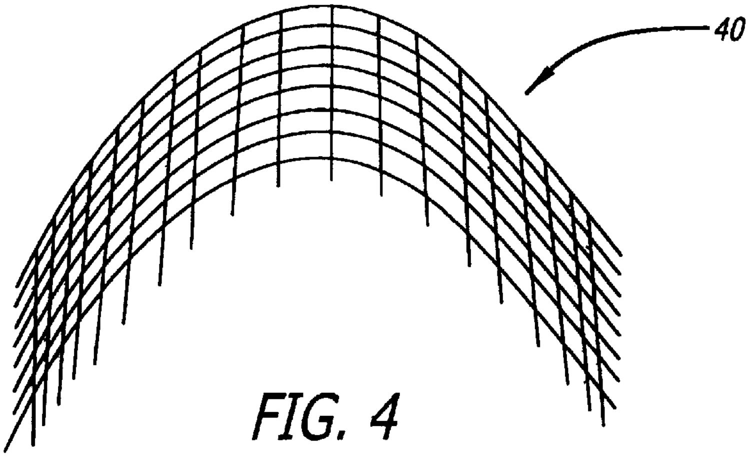
FIG. 4 is an exemplary wire mold for forming a shaped honeycomb of the type shown in FIG. 2 having a 90° bend with a radius of curvature of about 150 mm.
Figure 5:
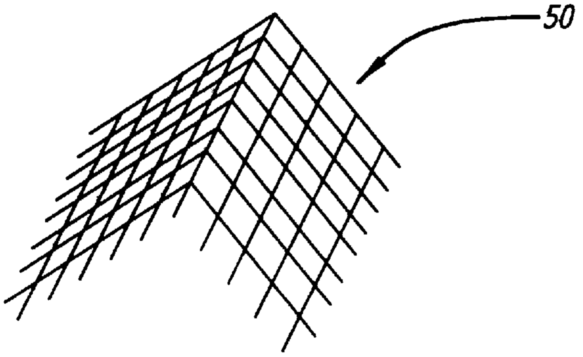
FIG. 5 is an exemplary wire mold for forming a shaped honeycomb having a 90° bend with a radius of curvature of about 5 mm.

Exemplary molds or fixtures for forming the shaped honeycomb are shown in FIG. 3 at 30, FIG. 4 at 40, and FIG. 5 at 50. The molds 30, 40 and 50 are preferably made from metal mesh or metal honeycomb to provide the open structures as shown in FIGS. 3–5. The use of such open structures was found to allow hot air to pass through the cells and dry the cores. The use of solid forms is undesirable since they block the ends of the cells and trap moisture within the core. It was found that even after 20 minutes at 80° C., cores remained wet using solid forms. Accordingly, it is preferred to use air permeable forms of the type shown in FIGS. 3–5 to ensure relatively rapid drying of the core. The wire mesh form shown in FIG. 3 is designed to form gently curving cores wherein the radius of curvature is about 1000 mm. The wire mesh form shown at 40 has a radius of curvature of about 150 mm and is designed to form shaped cores having a gradual 90° bend. Shaped cores of this type are shown at 20 in FIG. 2. The wire mesh mold 50 is designed for use when sharp 90° bends (i.e., radius of curvature of about 5 mm) are required. Although wire mesh forms are preferred, any other type of form may be utilized provided that the ends of the cells are not substantially blocked and a sufficient amount of air flow is allowed to achieve relatively rapid drying of the wet core after forming into the desired shapes.

The forming method applies to any cellulose-based cellular materials and in particular to those materials made in accordance with the method of U.S. Pat. No. 6,174,477 B1 (EP 0967070); that is a method of producing cellular materials in which an expanded cellular structure is formed from a dense, non-porous cellulose paper, which paper has an air permeance of less than 30 ml/min, an aqueous composition is applied to the cellular structure which is then heated sufficiently to stabilize the structure for commercial stability, the resulting structure being coated with a thermosetting resin and the resin is cured.

The cores made with these materials have a shape retention for which is usually at least 90%, preferably 95%. Preferably the amount of water and temperature and time of heating are sufficient to provide a shape retention of 90%, most preferably 95%. In particular the amount of moisture added is sufficient to provide at least 30% by weight of the dry paper core and the heating is at least 1 minute at a temperature of at least 100° C., the amount of moisture, temperature and time of heating being such as to provide a shape retention stability of at least 90% after 24 hours in the absence of external constraint, most particularly the amount of water is at least 60% by weight of the dry paper core and the shape retention obtained is at least 95% and especially preferred is an amount of water of at least 75% by weight of the dry paper core.

By shape set is meant that the sheets forming the wall of the cells are shaped into cellular structure and retain the shape of the cell when not under external constraint.

To determine whether the shape retention of the formed cellular structure is adequate, the retention is measured as follows:

The core material is formed in a cellular structure as described above including the final step of expanding out the cellular structures on a frame. The cell dimension is measured as $d_0$.

The core is set by spraying with water (or other aqueous liquid) and heated (preferably in an oven).

The core is removed from the frame and allowed to stand unconstrained for 24 hours.

The cell dimension is measured again on the unconstrained core (as measurement $d_1$).

Shape retention is:

$$100\times\frac{d_1}{d_0}\ \%$$

A satisfactory shape retention is one which is commercially sufficient for structural integrity in the final product. Usually this will be at least 90% and preferably 95%. Normally a shape retention of less than 90% will not give sufficient stability for further handling or stability for the final product.

Preferably the aqueous liquid is a solution of a fire retardant material. This method produces a light-weight honeycomb from a paper material which closely matches the excellent properties obtained with aramid papers but with considerable saving in cost and where the aqueous solution contains fire retardant matches the excellent fire retarding properties of aramid cellular structures. Other performance enhancers, such as tougheners, may be included.

Specifically, the cellular structure is formed by the steps outlined above of stacking sheets bearing node lines of adhesive, curing the adhesive under pressure with heat, placing the cured stack in a honeycomb expansion frame, expanding the cellular structure, spraying the expanded structure with water or other aqueous liquid, heating for a sufficient time to set the shape of the cellular structure, removing from the expansion frame, applying a thermosetting resin and curing the resin. The set cellular structure can readily be removed from the expansion frame after the setting step but prior to resin dipping. Where the aqueous liquid contains a flame retardant, this avoids the necessity of incorporating flame retardant at an earlier paper making stage.

The aqueous liquid can be applied by spraying or other techniques, for example dipping or curtain coating.

The aqueous liquid used for setting the cellular structure can be simple water but can contain biocides including anti-fungal-agents, surfactants, and possibly organic liquids to assist in penetration of water and to carry flame retardants.

The amount of aqueous liquid applied to the cellular structure can readily be determined by simple testing in that it is sufficient to incorporate sufficient aqueous liquid whereby on heating an adequate setting (shape retention) effect is achieved. The amount of liquid should be such as to moisten the surfaces of the paper throughout the block. The addition of too much moisture so that the block is saturated and dripping is to be avoided as the block might collapse. Particularly where the liquid contains a flame retardant, the amount of solution or dispersion and strength of solution or dispersion should be such as to deposit an appropriate amount of flame retardant in the paper structure. The desired shape retention, as described, is such as to provide a rigidity to the structure which is sufficient for commercial purposes usually at least 90%. Care should be taken that the amount of liquid applied is not such as to soften excessively the cellular structure.

As to the limits for water loading it is possible to use water loadings as low as, say 30% by weight of the dry paper core but this will not give a robust product. In other words, a core produced with 40% water load will shrink if kept in a moist (i.e., high relative humidity) environment for a prolonged period; 30 to 40% probably represents an absolute lower limit, and only if the expanded core is to be immediately coated with thermoset resin. For a reliable process, 60% water loading is preferable and 70% is most preferable.

The lowest limit in any given situation (i.e. temperature and time of heating and conditions for subsequent treatment) can readily be determined empirically by the stabilization measurement technique already described. The paper used will usually have an inherent water content (e.g., 4% by weight which should be taken into consideration when calculating the amount of water to be added).

The papers have an air permeance of less than 30 ml/min and are typical of the type of paper known as glassine papers. In the manufacture of these papers the paper pulp is beaten or refined to a high degree to reduce or fray the paper fibers. The resulting sheets can also be highly calendared. The resultant paper is dense and very translucent. The manufacture of this type of paper is discussed in the article on Paper in the *ENCYCLOPEDIA OF POLYMER SCIENCE AND TECHNOLOGY*, Vol. 9, John Wiley, 1968, page 719.

The preferred papers employed in the method of the invention are very dense papers having a smooth surface, high strength and low porosity air permeance less than 30 ml/min as measured by the Bendtsen Test (BS6538:2). The weight of the paper can be from 30 to 150 g/m$^2$. The surface, however, should be sufficiently porous to permit adhesion of the resin materials used in formation of the cellular structure. For that reason glassine papers which have been surface treated subsequent to calendaring with substances capable of generating a water repellent surface, for example siliconized surfaces or surfaces treated with fluorinated compositions, are generally unsuitable for this invention since they tend to prevent the adhesion of the resin materials. The paper also will have a low wicking force, i.e., a tendency to absorb organic solutions.

The resins used for forming the node lines will be those conventional in the manufacture of cellular structures from paper materials, for example thermosetting epoxy adhesives. Typical adhesives will be sodium silicate, starch, polyvinyl acetate, phenolic resins, resorcinol-formaldehyde resins, urea-formaldehyde resins and epoxy resins. The first three can bond at room temperature and the rest will often require heat.

In a preferred embodiment the paper is treated with an aqueous solution or dispersion of a flame retardant material. Preferred flame retardant materials are nitrogenous phosphates, particularly polyphosphates, and include nitrogen-containing salts of a phosphoric acid, particularly amine, ammonium or melamine and most preferably ammonium polyphosphate. Other types of fire retardants which could be used include ammonium orthophosphate, ethylene diamine phosphate and other amine phosphates, for example melamine phosphate. Others which could be used in place of or in addition to these include brominated compounds such as brominated phenols, imides, and alicyclics; chlorinated compounds, such as -chlorinated paraffins; alumina trihydrate; magnesium hydroxide; zinc borate; and aromatic phosphate esters and phosphonates. The contents of flame retardant in the aqueous liquid will depend on the amount of aqueous liquid left on the core after application. Normally a solution of 0.1% to 40% phosphate by weight solution would be used.

The amount of flame retardant added should be such as to result in a weight of dry flame retardant by weight of dry core of 0.5 to 20% of the total core weight especially 5% to 10%.

The application of the flame-retardant to the walls of the cellular structure by an aqueous system with subsequent drying may leave a coating of flame-retardant or incorporate it into the body of the structure by soaking it when wet.

The conditions of heating and time for heat setting the block depend to some extent on the size of the block and factors such as the paper thickness and cell size. The process can be carried out at a temperature of 100 to 190° C. for periods of from 1 minute to 1 hour preferably 10–40 minutes. A typical combination would be 20 minutes at 140° C., or until the weight of the block has stopped dropping.

The amounts of water added, time and temperature of heating tend to be empirical but determinable by simple testing to produce a cellular structure which has a set stability, that the structure retains its cellular shape when released from constraint. The heating conditions appear to be less critical than the degree of wetting, i.e., amount of water added. Very often the combination of conditions can be determined to a first approximation by folding a sheet of the paper, applying moisture then heat for a time and determining if the sheet retains the fold on release from constraint.

The resins used for coating the core which is formed in accordance with this invention may be selected from phenolics, epoxies, cyanate esters, bismaleimides, polyimide, benzo-bisoxazine, unsaturated polyesters and others well known in the art. The resin may beneficially contain particles of a thermosetting or thermoplastic polymer, as previously described in EP 0,820,858. The resin may also contain flame retardants, for example of the phosphate ester type, or particulate ammonium polyphosphates or other particulate materials, but this is not normally necessary owing to the excellent fire retarding properties obtained by following the above application procedure.

The honeycomb, after forming into the desired shape, can be formed into a conventional sandwich structure. The assembly may comprise an adhesive layer between the core and any outer skin or skins. The presence of a separate adhesive layer is however not necessary. The adhesive, if used, may be any of the types known in the art, i.e., phenolic, epoxy, contact or thermoplastic. There may be one or more skins on either or both sides of the core, and the skins may be metal, particularly aluminum; wood; prepreg, for example a glass, carbon, polyethylene or Kevlar reinforced prepreg in which the prepreg matrix can be any of the materials known in the art for instance cyanate ester, epoxy, phenolic, polyester and the reinforcement may be unidirectional or multi-directional, and may in the form of a cloth or mat, or may be composed of discontinuous fibers; or a pre-cured laminate such as phenolic, melamine/formaldehyde or urea/formaldehyde laminate; or there may be combinations of the above skins, for example a metal skin on one side and a glass prepreg on the other side.

In some instances, the honeycomb cells, after forming into the desired shape, can be filled with polymer foam before the skins are applied. This can be useful in applications where very good sound adsorption or thermal insulation is required. Cells can also be filled with various types of powders for similar reasons.

All of the features of the method and product of U.S. Pat. No. 6,194,477 B1 (European patent Application EP 0967070) are included herein by way of reference thereto.

The forming process of the present invention will now be illustrated by way of the examples.

EXAMPLE 1

For this Example a 90° turn, using ½" thick cellular material (core) was considered to be the benchmark by which core was said to form or not. No splitting of the core was allowed, although the core was formed in the easier direction. This is considered to occur when the core ribbon direction runs parallel to the "hinge" line of the 90° turn. The ribbon direction is the direction within the plane of the sheets which are adhered together via lines of adhesive and subsequently expanded to form the core.

Core samples made from 65 gsm paper of 25.2 mm thickness and nominal 48, 64, 80 and 123 Kg/m$^3$ densities were first dried in an oven set to 120° C. They were then weighed to give the weight of the sample with zero moisture content. The samples were then immersed into a bath of water. No special water is needed, tap water being used in this instance.

After a period of time each sample was removed, surface dried and weighed. This now gave a moisture pick-up of the core. An attempt was then made to form the core around the tool. If splitting could be heard the test would immediately be stopped and the core returned to the water tank for further pick-up of moisture. If the core formed around the tool without splitting this moisture content was recorded. The core was then dried on the tool to see if the core would remain "set" after drying. The results are shown in Table 1.

TABLE 1

| Honeycomb Density ($Kg/m^3$) | Dry weight (g) | Minimum forming weight (g) | Mositure pick-up (%) |
|---|---|---|---|
| 48 | 31.0 | 33.3 | 7.4 |
| 64 | 27.4 | 32.5 | 18.6 |
| 80 | 46.4 | 55.8 | 20.3 |
| 123 | 87.0 | Did not form (split) | N/A |

The honeycomb core was considered to have unsuccessfully formed when either the core took shape of the tool, but then "sprung" back towards its original flat state, or in second failure mode, where the honeycomb has split along its node line. The 123 $kg/m^3$ cores failed in this manner.

Table 1 shows that as the density of the core increases then so does the amount of moisture needed to form and set.

EXAMPLE 2

Honeycomb cores of the type shown in FIG. 1 were made according to the specifications set forth in Table 2.

TABLE 2

| | Density of paper | Resin Coating | Core Density | Cell Size | Thickness (T) (mm) |
|---|---|---|---|---|---|
| A | 65 $g/m^2$ | Epoxy (BSL834) | 48 $g/m^3$ | 5 mm | 6.86, 12.7, 25.0 |
| B | 65 $g/m^2$ | Phenolic (R169NF) | 48 $g/m^3$ | 5 mm | 6.86, 12.7, 25.0 |
| C | 65 $g/m^2$ | Epoxy (BSL852) | 80 $g/m^3$ | 3.5 m | 12.7 |
| D | 65 $g/m^2$ | Epoxy (BSL834) | 80 $g/m^3$ | 4 mm | 12.7, 25.0 |
| E | 65 $g/m^2$ | Epoxy (BSL852) | 123 $g/m^3$ | 12.4 mm | 12.7 |

The cores set forth in Table 2 were treated with water as follows:

1. Cut out samples (152.4 mm x 152.4 mm) of core from a slice of honeycomb.
2. Dry core at 140° C. for one hour.
3. Weigh the dried core.
4. Immerse in water at room temperature (16° C.) or 50° C.
5. Periodically remove samples from water bath.
6. Shake off excess water.
7. Knock off surface water by dropping onto aluminum honeycomb and dab with absorbent paper.
8. Reweigh wet core.

The results are summarized in Table 3.

TABLE 3

| | A | | | B | | | C | D | | E |
|---|---|---|---|---|---|---|---|---|---|---|
| Soak Time (mins) | 6.86 mm Water Uptake (%) | 12.7 mm Water Uptake (%) | 25 mm Water Uptake (%) | 6.86 mm Water Uptake (%) | 12.7 mm Water Uptake (%) | 25 mm Water Uptake (%) | 12.7 mm Water Uptake (%) | 12.7 mm Water Uptake (%) | 25 mm Water Uptake (%) | 12.7 mm Water Uptake (%) |
| 0 | 0 | 0 | 0 | 0 | 0 | 0 | 0 | 0 | 0 | 0 |
| 5 | 16 | | 16 | 12 | 16 | 11 | 32.0 | 8.9 | 8.0 | 3.7 |
| 15 | 19 | 17 | 19 | 14 | 21 | 15 | 36.6 | 9.6 | 9.7 | 4.4 |
| 30 | 21 | 21 | 18 | 16 | 22 | 16 | 37.6 | 9.3 | 8.9 | 3.9 |
| 60 | 24 | 23 | 23 | 18 | 25 | 20 | 39.6 | 9.1 | 9.9 | 4.5 |
| 90 | 27 | 24 | 27 | 19 | 26 | 22 | 38.8 | 9.5 | 10.1 | 5.1 |
| 120 | 26 | 27 | 28 | 19 | 26 | 26 | 39.7 | 9.1 | 10.4 | 5/1 |
| 150 | 27 | 27 | 28 | 20 | 28 | 26 | 39.0 | 9.2 | 10.4 | 5.3 |
| 180 | | 27 | | 21 | 28 | 28 | 39.6 | 8.8 | 10.5 | 5.0 |

Clearly the higher the water uptake the better the chances of forming the cores satisfactorily.

The moisture contents listed are minimum values to form and set this relatively sharp corner. Other trials that have shown lower moisture contents can be used for gentler corners.

No detrimental affect on mechanical performance has been found after putting the core through this forming process. In addition, forming core at moisture contents well above these minimum levels appears to increase the flexibility of the core. No known maximum moisture contents have been observed, despite efforts to find one.

As can be seen from Table 3, the majority of the water uptake occurs within the first 10 minutes of the soak. After this 10-minute period the rate of water uptake decreases as the core becomes saturated. This trend is true for all the cores tested. In addition, it was noted that water pick-up by the cores increases as the temperature of the water increases. Further, the total amount of water picked up by the core increases as water temperature increases.

EXAMPLE 3

The range of cell sizes and core densities which are presently available produce materials with very different stiffness and formability. To accommodate the lack of flexibility of the higher density cores, the following forming example utilized three molds with different radii of curvature (see FIGS. 3–5).

Tight right angle with radius of curvature~5 mm (FIG. 5 at 50).

Relaxed right angle with radius of curvature~150 mm (FIG. 4 at 40).

Gentle curve with radius of curvature~1000 nm (FIG. 3 at 30).

The molds were manufactured from steel mesh and aluminum honeycomb so that the open structure would allow hot air to pass through the cells and dry the core. As previously mentioned, aluminum sheet bent at right angles does not allow air to pass through the core, the end of the cells are blocked by the mold thus trapping water and even after 20 minutes at 80° C. the core was still wet.

The various honeycomb materials set forth in Table 2 were soaked in water and attempts were then made to form the honeycomb over the molds followed by drying to form shaped honeycomb. The results are set forth in Table 4.

TABLE 4

| Core | Slice Thickness (mm) | Minimum Radii of Curvature 90° (FIG. 5) (5 mm) | 90° (FIG. 4) (150 mm) | Curve (FIG. 3) (1000 mm) |
|---|---|---|---|---|
| A | 6.86, 12.7, 25.0 | 10 min. Cold Water (16° C.) (successful) | 10 min. Cold Water (16° C.) (successful) | 10 min. Cold Water (16° C.) (successful) |
| B | 6.86, 12.7, 25.0 | 30 min. Cold Water (16° C.) (successful) | 30 min. Cold Water (16° C.) (successful) | 30 min. Cold Water (16° C.) (successful) |
| C | 12.7 | 30 min. Cold Water (16° C.) (successful) | 30 min. Cold Water (16° C.) (successful) | 30 min. Cold Water (16° C.) (successful) |
| D | 12.7, 25.0 | unsuccessful | 120 min. Cold Water (54° C.) (successful) | 120 min. Cold Water (54° C.) (successful) |
| E | 12.7 | unsuccessful | unsuccessful | 60 min. Warm Water (54° C.) (successful) |

Core type A can be formed around very tight radii of curvature such as mold 50. The type A material can be used to form complex shapes after a 10–15 minute soak in cold water. The C core also formed well around the tight radii of mold 50. The C core can be used to form fairly complex shapes, although the 3.5 mm cell size gave a stiffer feel when compared to the A core. The D core was considerably stiffer than either the A or C core materials mentioned above. It would form around a 150 mm radii of curvature if the core was soaked for 2 hours at 54° C. The low water uptake is believed to have an effect on the formability.

The E core was a very stiff material. It was very difficult to form around mold 40 even after a 40 hour soak at 54° C. The core formed around mold 30 after a 60 minute soak in water. The core also had a-very low percent water uptake.

In conducting the above-described examples, it was generally found that:

i) cellular material with a low resin content, high paper ratio have a high uptake of water and can be formed around complex shapes after a 30–60 minute soak in cold water. This is followed by a 20 minute drying step in the oven at 80° C.

ii) Cellular materials with a higher proportion of resin have a lower water uptake and may require from 2 to 5 hours in warm water to form around simple shallow angle molds.

It can be seen from the above that the forming method of the invention provides a reliable, cost-effective, environmentally friendly process of forming that provides good results for a wide variety of core material.

Having thus described exemplary embodiments of the present invention, it should be noted by those skilled in the art that the within disclosures are exemplary only and that various other alternatives, adaptations and modifications may be made within the scope of the present invention. Accordingly, the present invention is not limited to the above preferred embodiments and examples, but is only limited by the following claims.

What is claimed is:

1. A method for forming a cellular material into a shaped cellular material, wherein said cellular material comprises cells having walls, comprising cellulose based paper, said method comprising the steps of:

treating said cellular material with a sufficient amount of water to form a moistened cellular material;

forming said moistened cellular material into a moistened shaped cellular material; and removing a sufficient amount of water from said moistened shaped cellular material to form said shaped cellular material.

2. A method according to claim 1 wherein said cellulose based paper is coated with a resin.

3. A method according to claim 1 wherein said cellulose based paper has an air permeance of less than 30 ml/min.

4. A method according to claim 1 wherein said steps of forming said moistened cellular material and removing water is accomplished on a mold which is air permeable.

5. A method according to claim 2, wherein the degree of moisture pick up prior to forming is such as to provide a cellular material moisture content of at least 7% by dry weight of the cellular material.

6. A method according to claim 2, wherein the cellular material has a density of no more than 144 kg/m$^3$.

7. A method according to claim 6, wherein the cellular material has a density of no more than 80 kg/m$^3$.

8. A method according to claim 1, wherein the cellular material has a thickness of no more than 25 mm.

9. A method according to claim 1, wherein the temperature at which the method is performed is less than 180° C.

10. A method according to claim 1, wherein the temperature at which the method is performed is in the range from 20° C. to 80° C.

11. A method according to claim 1 wherein said cellular material is in the form of a honeycomb.

12. A method for forming a structurally stable cellular material into a shaped cellular material, said method comprising the steps of:

A. providing structurally stable cellular material which is made by a method comprising the steps of:

providing a dry cellular structure comprising dense, nonporous paper having an air permeability of less than 30 ml/min wherein said dry cellular structure has a shape retention of less than 90%;

treating said dry cellular structure with a sufficient amount of an aqueous liquid to provide a wet cellular structure comprising water in an amount equal to at least 30% by weight of said dry cellular structure; and heating said wet cellular structure for a sufficient time at a sufficient temperature to dry said wet cellular structure to provide a cellular structure having a shape retention of greater than 90%.

B. treating said structurally stable cellular material with a sufficient amount of water to form a moistened cellular material;

C. forming said moistened cellular material into a moistened shaped cellular material; and D. removing a sufficient amount of water from said moistened shaped cellular material to form said shaped cellular material.

13. A method according to claim 12 wherein said structurally stable cellular material is coated with a resin prior to said step of treating said structurally stable cellular material with water.

14. A method according to claim 12 wherein said step of forming said moistened cellular material and said step of removing water from said moistened shaped cellular material is accomplished on a mold which is air permeable.

15. A method according to claim 13 wherein said step of forming said moistened cellular material and said step of removing water from said moistened shaped cellular material is accomplished on a mold which is air permeable.

16. A method according to claim 12 wherein said structurally stable cellular material is in the form of a honeycomb.

17. A shaped cellular material made according to the method of claim 1.

18. A shaped cellular material made according to the method of claim 2.

19. A shaped cellular material made according to the method of claim 12.

20. A shaped cellular material made according to the method of claim 13.

21. A shaped cellular material according to claim 17 wherein said shaped cellular material is in the form of a honeycomb.

22. A shaped cellular material according to claim 18 wherein said shaped cellular material is in the form of a honeycomb.

23. A shaped cellular material according to claim 19 wherein said shaped cellular material is in the form of a honeycomb.

24. A shaped cellular material according to claim 20 wherein said shaped cellular material is in the form of a honeycomb.

* * * * *